United States Patent
Li et al.

(10) Patent No.: US 8,364,114 B2
(45) Date of Patent: Jan. 29, 2013

(54) EMERGENCY AND PRIORITY CALLING SUPPORT IN WIMAX

(75) Inventors: Zexian Li, Espoo (FI); Roman Pichna, Espoo (FI); Ravi Shankar Pandey, Masala (FI); Tommi Olavi Rantanen, Tampere (FI); Jukka Sakari Ala-Vannesluoma, Tampere (FI); Jani Petteri Hirsimäki, Tampere (FI); Iikka Antero Oksanen, Tampee (FI); Mikko Jarkko Oskari Tasa, Tampere (FI); Toshiaki Jozawa, Tokyo (JP); Christophe Francois Pierre Marie Le Thierry D'ennequin, Tokyo (JP)

(73) Assignee: Nokia Corporation, Espoo (FI)

( * ) Notice: Subject to any disclaimer, the term of this patent is extended or adjusted under 35 U.S.C. 154(b) by 263 days.

(21) Appl. No.: 12/525,292

(22) PCT Filed: Jan. 30, 2008

(86) PCT No.: PCT/IB2008/000213
§ 371 (c)(1),
(2), (4) Date: Jan. 27, 2010

(87) PCT Pub. No.: WO2008/093218
PCT Pub. Date: Aug. 7, 2008

(65) Prior Publication Data
US 2010/0135205 A1     Jun. 3, 2010

Related U.S. Application Data

(60) Provisional application No. 60/898,397, filed on Jan. 31, 2007.

(51) Int. Cl.
*G06F 15/18* (2006.01)

(52) U.S. Cl. .................................. 455/404.1; 455/414.1

(58) Field of Classification Search ............... 455/404.1, 455/414.1, 437, 445, 446, 450
See application file for complete search history.

(56) References Cited

U.S. PATENT DOCUMENTS

| | | | |
|---|---|---|---|
| 6,115,598 A | 9/2000 | Yu | |
| 2004/0058695 A1 * | 3/2004 | Ji et al. .......................... | 455/500 |
| 2006/0030290 A1 | 2/2006 | Rudolf et al. | |
| 2006/0154645 A1 | 7/2006 | Valkenburg | |
| 2007/0143613 A1 | 6/2007 | Sitch et al. | |
| 2007/0258407 A1 | 11/2007 | Li et al. | |
| 2007/0265005 A1 | 11/2007 | Sitch | |

(Continued)

FOREIGN PATENT DOCUMENTS

WO     0028765 A     5/2000

OTHER PUBLICATIONS

International Search Report and The Written Opinion of the International Searching Authority, received in corresponding PCT Application No. PCT/IB2008/000213, Dated Sep. 10, 2008, 16 pages.

(Continued)

*Primary Examiner* — Sam Bhattacharya
(74) *Attorney, Agent, or Firm* — Mintz Levin Cohn Ferris Glovsky and Popeo, P.C.

(57) ABSTRACT

The present invention provides methods, apparatuses, and systems for supporting emergency calls on a WiMAX access network. According to an embodiment of the invention, a method of providing emergency calling in a WiMAX network is provided. The method includes determining whether a call from a subscriber station (SS) is an emergency call. To enable making an emergency call, the minimum bandwidth required to enable SIP signaling is reserved and required resources are allocated from the access service network gateway (ASN-GW) via a base station (BS).

23 Claims, 11 Drawing Sheets

U.S. PATENT DOCUMENTS

2010/0022248 A1* 1/2010 Lukacs .................. 455/445
2010/0142442 A1 6/2010 Pandey et al.

OTHER PUBLICATIONS

WIMAX Forum: "WiMAX End-to-End Network Systems Architecture—(Stage 2: Architecture Tenets, Reference Model and Reference Points), Dec. 15, 2005 DRAFT".

IEEE Std 802-16-2004, "Part 16: Air Interface for Fixed Broadband Wireless Access Systems", Oct. 1, 2004.

IEEE Std 802.16e-2005, "Part 16: Air Interface for Fixed and Mobile Broadband Wireless Access Systems; Amendment 2: Physical and Medium Access Control Layers for Combined Fixed and Mobile Operation in Licensed Bands and Corrigendum 1", Feb. 28, 2006.

* cited by examiner

EMERGENCY AND PRIORITY CALLING SUPPORT IN WIMAX

RELATED APPLICATION

This application was originally filed as PCT Application No. PCT/IB2008/000213 filed Jan. 30, 2008 which claims priority to U.S. Provisional Application No. 60/898,397 filed Jan. 31, 2007.

BACKGROUND OF THE INVENTION

1. Field of the Invention

The present invention is directed, in part, to methods, apparatuses, and systems for providing emergency services in WiMAX networks.

2. Description of the Related Art

WiMAX, or Worldwide Interoperability for Microwave Access, is a technology that is standardized and certified by the WiMAX Forum, formed in June 2001 to promote conformance and interoperability of the IEEE 802.16 standard, officially known as WirelessMAN. The WiMAX Forum describes WiMAX as "a standards-based technology enabling the delivery of last mile wireless broadband access as an alternative to cable and DSL." As such, WiMAX has the potential to replace many existing telecommunication infrastructures.

The fixed version of WiMAX (IEEE 802.16) is expected to provide broadband data services as an alternative to ADSL in countries where landline telephone networks are not well deployed, and the further evolved mobile version (IEEE802.16e) would complement the existing cellular systems (i.e. GSM, WCDMA, cdma200) and bring higher data throughput to subscribers than HSPA (High Speed Packet Access) in high mobility environments (up to 120 km/h).

While the IEEE standards specify L1/L2 air interface protocols between a Subscriber Station (SS) and Base Station (BS). (This disclosure alternatively refers to the user equipment as a subscriber station, mobile station, and/or terminal. The user equipment, subscriber station, mobile station, or terminal may be any kind of mobile or fixed user equipment or mobile station, such as a mobile phone, a fixed phone, a personal computer (PC), a laptop, a personal digital assistant (PDA) or the like). WiMAX Forum has tried to specify the end-to-end WiMAX network architectures and ensure interoperability between terminal products and network equipment manufactured by different terminal and infrastructure vendors.

WiMAX was originally developed as a data-centric wireless access and supports such typical packet data services as real-time polling and best effort. In addition to those services, WiMAX also supports Voice over Internet Protocol (VoIP) that transports VoIP data packets on a periodic basis. MAC (L2 protocol) plays a central role in negotiating Quality of Service (QoS) traffic parameters for VoIP and creating a service flow (hence, radio bearer) to transfer voice packets between the SS and BS.

Although the WiMAX system specifies a mechanism to offer voice services, its standards do not yet support emergency calls. However, support of emergency services in telecommunication systems is required by regulatory authorities in many markets, including the requirement of prioritized access to emergency centers for emergency calls. In large scale emergencies, wireless networks are likely to become congested with calls. As a result, calls to and from emergency response personnel may also be blocked. Therefore, wireless networks should possess the capability of providing several levels of priority for processing emergency calls in heavy network traffic.

In addition to the well known 911 emergency calling, wireless priority service (WPS) is a system in the United States that allows high-priority emergency telephone calls in congestion situations on wireless telephone networks for selected emergency response management personnel. This complements the Government Emergency Telecommunications Service (GETS), which allows such calls on landline networks. The service is overseen by the Federal Communications Commission and administered by the National Communications System in the Department of Homeland Security. WPS allows high-priority calls to overcome that congestion and receive priority. The system is authorized only for use by National Security and Emergency Preparedness personnel, classified into five categories: Executive leadership and policy makers (e.g. the president of the United States and members of congress); Disaster response/military command and control; Public health, safety, and law enforcement command; Public services/utilities and public welfare; and Disaster recovery.

Telecommunications Service Priority (TSP) is the highest level of priority which provides guaranteed priority for restoration of telecommunications services when service providers' resources are overextended and provides priority provisioning for wireline telecommunications services when the normal provider processes will not meet the need. In view of the importance of providing support for emergency services, there is a need for WiMAX networks to also provide the mechanisms necessary to support emergency call handling so that users can easily contact public safety departments with a WiMAX-capable terminal. WiMAX Forum SPWG requires multiple priority levels for flows related to Location Based Services (LBS). This will enable the QoS differentiation between LBS service flows. Therefore, if contention for resources arises, a higher-priority LBS flow or an Emergency Service shall have precedence over lower-priority flows.

SUMMARY OF THE INVENTION

In order to fulfill the requirement for providing support for emergency services, the present invention provides methods, apparatuses, and systems for supporting emergency calls on a WiMAX access network.

According to an embodiment of the invention, a method of providing emergency calling in a WiMAX network is provided. The method includes receiving a request from a subscriber station (SS) in a WiMAX network, detecting that the request from the subscriber station (SS) or mobile station (MS) is a request for an emergency call. To enable making an emergency call in congested networks, the request is transmitted to an access service network gateway, the minimum bandwidth required to enable session initiation protocol (SIP) signaling is provided and required resources for making the emergency call are allocated from the access service network gateway (ASN-GW) via a base station (BS).

Embodiments of the present invention also provide a communication system which includes a subscriber station (SS), base station (BS), and an access service network gateway (ASN-GW). The SS, when attempting to make an emergency call in a WiMAX network, is configured to send a request to the BS. The request may include an indication that the request is for an emergency call. The BS forwards the request to the ASN-GW which is configured to allocate the resources for the emergency call and to return a response to the SS via the BS.

An example of the present invention also includes an apparatus in a WiMAX network. The apparatus includes a transmitter configured to transmit a request for an emergency call to a base station. The apparatus also includes a receiver configured to receive a response, including the allocated resources for making the emergency call, from the ASN-GW. The apparatus may further include a detector configured to detect that a service being requested by the user is an emergency call. The apparatus may be any type of user equipment, such as a subscriber station (SS) or mobile station (MS).

Embodiments of the present invention further include an apparatus in a WiMAX network, the apparatus including a receiver configured to receive a request for an emergency call from a subscriber station (SS). The apparatus also includes a transmitter configured to transmit the request to the ASN-GW. The transmitter may also be configured to transmit emergency call information to the SS in certain situations, such as emergency broadcasts. The receiver is further configured to receive a response from the ASN-GW, the response including an indication of allocated resources, and the transmitter is further configured to forward the response to the SS. According to one example of the invention, the apparatus is a base station.

Embodiments of the present invention also include an apparatus, such as a gateway, in a WiMAX network. The gateway includes a receiver configured to receive a request from a subscriber station (SS), which is attempting to make an emergency call, via a base station (BS). Upon receiving the request, an allocator is configured to allocate the resources for the emergency call. The gateway may also include a transmitter configured to transmit a response to the SS, via the BS. The response may include an indication of the allocated resources. The gateway may be an access service network gateway (ASN-GW).

Embodiments of the invention also include a method comprising transmitting a request for an emergency call in a WiMAX network from a subscriber station to a base station. The request indicates that it is a request for an emergency call. The method also includes receiving a response including allocated resources for making the emergency call from an access service network gateway.

A further example of the invention includes a method comprising receiving a request from a subscriber station attempting to make an emergency call in a WiMAX network, allocating resources for the emergency call, and transmitting a response, to the subscriber station, including an indication of the allocated resources.

Furthermore, embodiments of the present invention are directed to additional network elements, such as, MIP HA, AAA server, subscriber and server databases, and policy servers, which all may take part in emergency or priority signaling.

According to another embodiment of the invention, a method of providing emergency calling for a mobile station (MS) in a WiMAX network wherein the MS is not a subscriber to the network is provided. The method includes receiving a request at the base station (BS), the request including an added type length value (TLV) for notifying the BS that the MS intends to make an emergency call. The method further includes permitting the MS, which does not have a subscription, to connect to the network to make the emergency call without performing initial network entry authentication of the MS.

In addition, in one example of the invention, if some emergency priority level is signaled by a higher level protocol, an application server can signal an emergency to WiMAX using a specialized interface similar to 3GPP Gx or 3GPP2 Ty. This signaling is propagated from the connectivity services network (CSN) to the access service network (ASN) via a WiMAX Policy and Charging Control (PCC) interface and then using R4/R6 to the BS. The BS can prioritize usage of resources across radio interface (R1) accordingly.

If priority level is indicated by subscription, this information is propagated together with the information as described above.

BRIEF DESCRIPTION OF THE DRAWINGS

For proper understanding of the invention, reference should be made to the accompanying drawings, wherein.

DETAILED DESCRIPTION OF THE PREFERRED EMBODIMENT(S)

Figure 1:
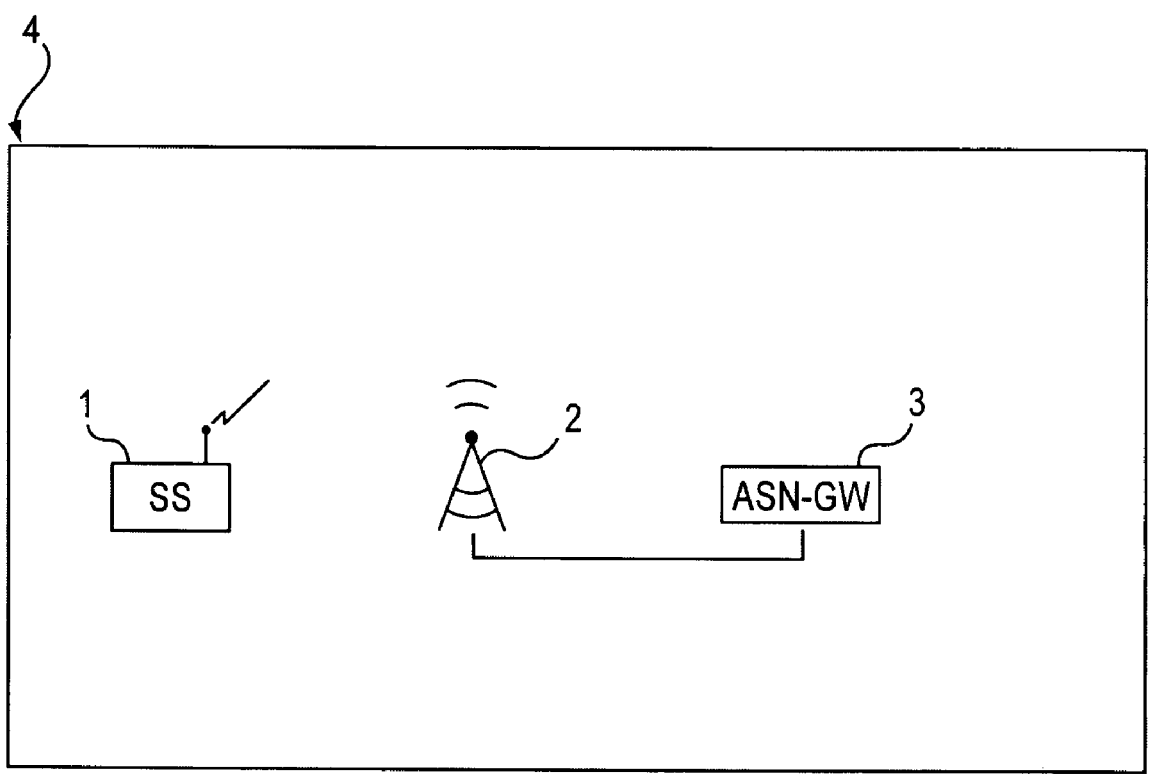
FIG. 1 illustrates a system according to an embodiment of the invention.

The present invention provides, in one embodiment, methods, apparatuses, and systems for supporting emergency services, such as TSP/WPS/E911, in WiMAX. In particular, embodiments of the invention enable emergency support in WiMAX by prioritizing emergency call set up and resource allocation. One objective of the invention is to use the standardized and certified legacy 802.16e radio device without modifications and possibly include legacy WMF Rel.1 terminals in some aspects of the emergency call processing.

In order to provide support for emergency or priority calling, embodiments of the present invention include prioritized processing of in-band C-Plane for emergency VoIP call setup and resource allocation. All users, even with only best effort (BE) QoS subscription are provided with the minimum bandwidth (BW) needed to enable emergency SIP signaling (e.g. WPS/TSP/E911) at any network load conditions. The proposed bandwidth value is configurable (e.g. 100 b/s) and can be decreased when emergency resource limits are imposed higher in the network aggregation hierarchy points. This dimensioning takes into account the expected number of users in idle mode in the coverage area.

According to another aspect of the invention, during congestion situations, regular users are not purged out of the network. Rather, the aggregate data rate for the user will be gradually squeezed down to VoIP BW (e.g. 100 kb/s). If more resources for emergency or priority calls are needed, then the non-emergency calls can be randomly dropped. At most, the bandwidth of non-emergency sessions is limited to the signaling minimum of 100 b/s, effectively dropping the services that user is using. Regular subscriber stations will not be signaled the modified QoS, but the scheduler will limit the resources for the flows. This is done to reduce the signaling load and prevent terminals from re-requesting original bandwidth. Allocation of resources for emergency call is done from the Access Service Network Gateway (ASN-GW) to the BS and then to the SS in emergency calls (if emergency signaling in L2, i.e. IEEE 802.16e MAC, is not available). If there are separate flows used for VoIP, then they are reduced last.

Additionally, embodiments of the invention provide prioritized processing of ranging for emergency network entry, emergency idle-active transaction, or handover processing. IEEE 802.16-2004 section 6.3.9.5 states that ranging starts with lower power and, if failed, increases the transmit power up to $P_{TX\_IR\_MAX}$. If the SS recognizes that the call is for TSP/WPS/E911, it will start CDMA code signaling with power set to $P_{TX\_IR\_MAX}$. Ranging Purpose Indication can be used for indicating at least 7 levels of priorities (3 bits are needed). As defined in 802.16e, section 11.5 bits 2-7 are reserved and, therefore, more priority levels can be supported. The present invention utilizes these reserved bits for emergency indication.

Embodiments of the invention also provide prioritized processing of dynamic service addition (DSA)/dynamic service change (DSC)/resource request (RR)/DP (setting or modifying) signaling. DSA/DSC-REQ/-RSP has one traffic priority byte. For instance, 3 bits of the traffic priority byte can be used to indicate 7 levels of priority above regular. More bits of the bytes can be used to indicate more levels. RR-REQ/RR-RSP/DP-REQ/DP-RSP messages are extended to use the same number of bits to indicate the priorities. Emergency indication signaling is therefore provided in R3 between the home agent (HA) ASN-GW directly, or via authorization, authentication and accounting (AAA). So signaling from the core network to the terminal or from the terminal to the core network enables an emergency session with higher priority and resource allocation.

The network may indicate overload (not emergency) situations to the terminals to minimize the SS-originated signaling and enable the SS to scan for other BSs with available resources. The terminal has the freedom to select the cell with the least load. L2 signaling responses contain an 8 bit confirmation code in DSx messages (see 802.16-2004, sec. 11.13, reject-temporary/reject-resource). An overload situation is indicated in the "beacon" management broadcast frames.

In the 3GPP/3GPP2 WiMAX interworking case, emergency is signaled via 3GPP Gx/3GPP2 Ty or similar interface, when PCRF or its evolution signals level of emergency priority (and QoS, charging rules) towards WiMAX network (e.g. policy server, AAA, or HA).

According to another embodiment of the present invention, processing of emergency sessions with anonymous access (e.g., no SIM) is provided. Emergency anonymous access signaling may be provided in R3 between HA-ASN-GW directly, or via AAA. The HA is provided with anonymous emergency session signaling in order to start filtering the non-emergency traffic to prevent abuse of anonymous emergency access at the HA. Alternatively, the same filtering (e.g., limiting flows to internet protocol multimedia subsystems IMS-S, media gateway MGW) can also be done in ASN-GW or any core network U-Plane network element(s). An example of R3 anonymous emergency session signaling is REG-REQ with DSCP set to indicate priority, e.g. E911. IMS (VoIP-S) receives emergency indication, signals directly to MSG to limit calls to the public safety answering point (PSAP) only. Anonymous users may use an emergency network access identifier (NAI) indicating emergency, which is related to MS ID (MAC@). Anonymous users can skip subscription authentication (e.g., using TLS-extensible authentication protocol (EAP) with anonymous emergency NAI) and no keying material is derived for R1 (like in GSM). MS certificates can be used for anonymous user delay of service (DOS) prevention. The MS is always authenticated and a mechanism for purging/barring can be used for denying service to abusive/faulty terminal. Alternatively, the user plane filtering can be done in the ASN-GW.

FIG. 1 illustrates an example of a system in one embodiment of the invention. The system includes a subscriber station (SS) 1 in a WiMAX network 4. The SS 1 is in communication and/or served by a base station (BS) 2. The BS 2, in turn, is in communication with an access service network gateway (ASN-GW) 3.

Figure 11:
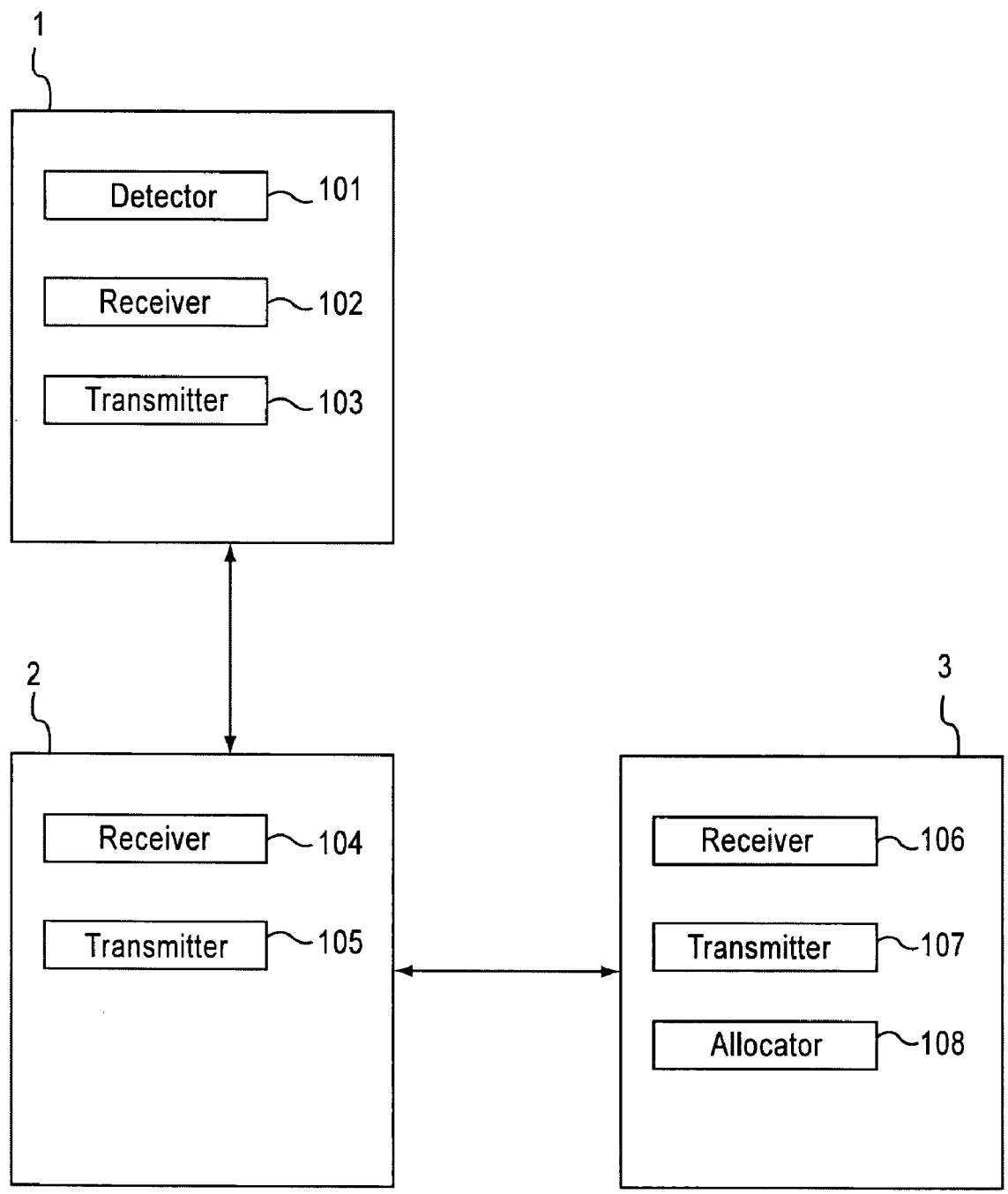
FIG. 11 illustrates a block diagram of a system according to one embodiment of the invention.

As further illustrated in FIG. 11, according to one embodiment of the invention, the SS 1, when attempting to make an emergency call in the WiMAX network, sends a request to the BS 2 via a transmitter 103. The request may include an indication that the request is for an emergency call. The detector 101 may detect that the request is for an emergency call. The BS 2 receives the request at receiver 104. The transmitter 105 forwards the request to the ASN-GW 3, which includes a receiver 106 for receiving the request. The allocator 108 allocates the resources for the emergency call and the transmitter 107 returns a response to the receiver 102 of SS 1 via the BS 2.

Figure 2:
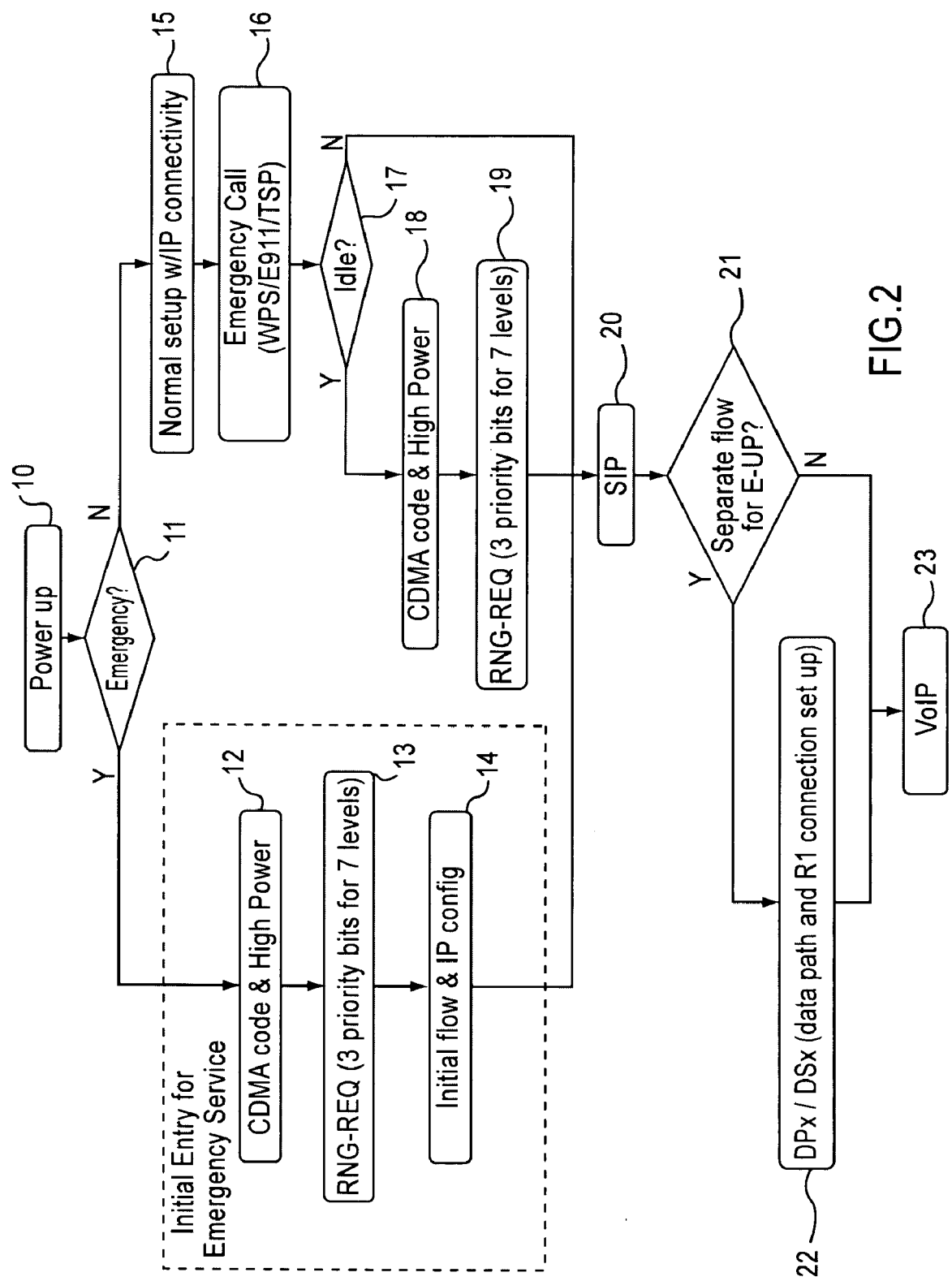
FIG. 2 is a flow diagram illustrating a method of emergency call setup according to one embodiment of the invention.

FIG. 2 is a flow diagram, according to one embodiment of the invention, illustrating a method of emergency call setup when the SS is in the different states of network entry, idle mode and active mode. Upon power up 10, it is determined whether the SS is attempting to make an emergency call 11. If it is, then the SS begins CDMA code signaling with power set to high 12. Then, a range request with three priority bits for at least seven levels of priority is performed 13, followed by initial flow and internet protocol (IP) configuration 14. Next, session initiation protocol (SIP signaling is performed 20. It is then determined whether there is a separate flow for E-UP 21. If there is not, then the VoIP session is established 23. If there is a separate flow for E-UP, then data path and R1 connection setup is performed 22 followed by establishment of the VoIP session 23.

Further, as illustrated in FIG. 2, when it is determined that, upon power up 10, the SS is not attempting to make an emergency call then normal setup with IP connectivity will be performed 15. Then, when the SS attempts to make an emergency call 16, it is first determined whether the SS is in the idle state 17. If it is not in idle mode, then the SS proceeds to the SIP signaling step 20 and proceeds as outlined above. If, however, the SS is in idle mode, then the SS begins CDMA code signaling with power set to high 18. Next, a range request with three priority bits for at least seven levels of priority is performed 19, and the SS proceeds to the SIP signaling step 20. Thus, through the method illustrated in FIG. 2, the steps of ranging and service flow setup are used to provide priorities to emergency sessions.

Embodiments of the present invention also include a mechanism, namely emergency mode, for providing emergency services in WiMAX networks. That is, the subscriber station (SS) for which the emergency services are needed enters into an emergency mode of the WiMAX network before using the emergency services. As a result, when emergency services are needed, network access is guaranteed to any available WiMAX network independently of whether the SS has permission to otherwise access the network. In addition, service flows for emergency services are provided.

The emergency mode is related to three different use cases. The first use case is when the SS is not connected to any network and it must perform entry to a WiMAX network to use emergency services. The second use case is when the SS is already connected to some WiMAX network, and it needs emergency services. The third use case is when handover is performed when emergency services are used. Each use case is described in more detail below.

Use Case 1—SS is not Connected

When the SS is not connected to any network and wishes to use emergency services, it may enter into a WiMAX network, and it is immediately set into emergency mode, utilizing one of the following alternatives:

Ranging: SS indicates in the ranging (RNG-REQ) that it wants to enter into emergency mode by using a new or any existing Type Length Value (TLV). SS may use more sophisticated ranging in terms of power level to initiate emergency services faster. It does not have to try the ranging starting from very low power levels but rather use higher power levels to speed up the ranging. After the ranging, the network can skip authentication and allow the SS to enter into WiMAX network and its emergency mode.

Authentication: SS gives a special NAI to request emergency mode. There are three different types of special NAIs that could be used (reserved word part of the NAI is in italic in examples). The first one has reserved realm, for example, emergency@*emergency.org*. The second one has reserved username, and the realm belongs to the network to be connected to, for example, *emergency*@nsp.where.connectionis.made.com. The third one has reserved decoration, for example, *emergency*!user@myhomensp.com.

Other phase/message or a new MAC message: SS requests emergency mode with a new or existing TLV in some WiMAX MAC message. If authentication is after this phase, it may be omitted or an anonymous authentication may be done.

If, for some reason, entering into the emergency mode fails, the SS may try some other network, or alternatively, try to provide emergency services in normal mode by trying to enter into the network normally. Moreover, if SS has information about its location, it should be included into the data of the message used to enter to the emergency mode.

When the SS is in the emergency mode, either the SS or the BS initiates creation of the needed service flows. Service flow creation message (DSA-REQ) may contain a new TLV to indicate that a service flow for the emergency mode is needed. Created service flows are tunneled to a public safety answering point (PSAP) and they cannot be used for any other purpose but emergency services. Dynamic host configuration protocol (DHCP) discovery could be used in detecting the address of the PSAP.

Higher layer mobility handling responsibilities managed by the home network service provider (NSP) are taken care of by the WiMAX network that the SS is connected to, since there may be no information (in case authorization was not performed and decorated special NAI used) about the home NSP.

In this use case, exiting from emergency mode is done similarly to normal network exit. Because a WiMAX connection was made for the emergency services, it will be closed when emergency services are no longer needed taking into account that callback possibility may be needed for some time. If the connection is needed for normal operation after emergency services, normal network entry must be performed.

Similar functionality may be obtained by performing normal network entry, and then using methods presented in use case 2.

Use Case 2—Ss is Already Connected

When the SS is connected to the network, it should know whether the emergency mode is supported or not. This is achieved by adding a new (or updating some existing) TLV into the SBC-RSP message (or into some other/new MAC message) to indicate emergency mode support. This TLV would need to be used by the network if it supports emergency mode. If it were missing, then the network would not support emergency mode. Alternatively, the SS could request this information in SBC-REQ (or in some other/new MAC message) with a new TLV, which may indicate either only a request for network's support for emergency mode, or also whether SS supports it.

If the network does not support emergency mode and emergency services are needed, the SS attempts to perform a handover into a new network that would support it. However, if emergency mode is supported, it can be handled with one of the following alternatives:

Service flow creation: the SS starts to create service flow (DSA-REQ) for the emergency services. A new TLV is included (or an existing TLV is updated) into DSA-REQ to indicate that the flow is for emergency services. This TLV triggers the network to enter into the emergency mode. Otherwise, service flow creation follows corresponding part of use case 1. The exiting from the emergency mode is done by deleting emergency service flows. When the last emergency service flow is deleted, emergency mode is closed.

Ranging, registration or some other/new message: SS requests emergency mode with a new TLV in a WiMAX MAC message. After that, service flow creation for the emergency services follows the description of the corresponding part in use case 1. The exiting of emergency mode in this case could be done using the same TLV in a MAC message.

If entering into the emergency mode fails and retries do not succeed, the SS may try to perform a handover to another network, or alternatively, try to provide emergency services in normal mode just like other similar services, such as a normal voice call. Moreover, if SS has information about its location, it could be included in the data of the message used to enter the emergency mode or transferred to the BS with some other/new MAC message.

Use Case 3—Handover is Performed

Handover may be performed when an SS is in emergency mode and it may be either SS-initiated or BS-initiated. In both cases, the handover should be performed into a network that supports emergency mode. This is achieved by adding emergency mode support information into each BS data in MOB_NBR-ADV and MOB_BSHO-REQ/RSP messages (and maybe some other/new MAC messages). In addition, when performing ranging in the target BS, SS could indicate that it is in emergency mode (by using a new TLV or some other new data field for this purpose), although the BS may have been informed about it by the network in case of network assisted handover.

Emergency service flows are maintained by the network during handover with higher priority compared to other flows. If there are not enough resources for the emergency service flows in the SS or in the network, some other service flows must be dropped. In addition, higher layer mobility may also be maintained by the network to guarantee uninterrupted usage of emergency services.

As mentioned above, existing cellular systems (GSM, UMTS) permit terminal users without a subscription (i.e. without SIM/USIM) to make an emergency call from a cellular terminal. Embodiments of the present invention similarly allow for WiMAX networks to accept emergency calls from users without a subscription.

Figure 3:
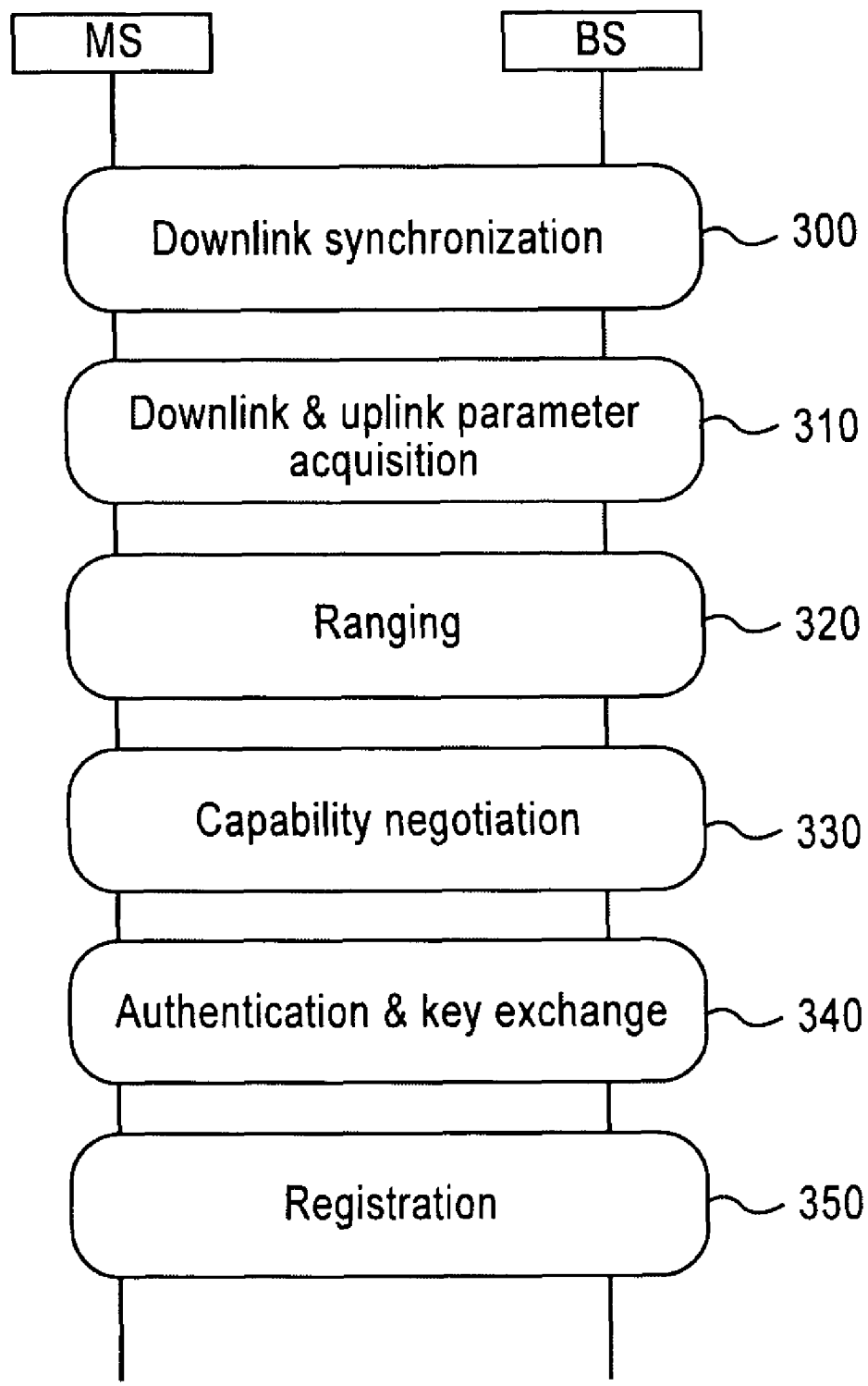
FIG. 3 illustrates an example of the initial network entry process.

In order to provide such access, in one example, the invention provides simplified initial network entry without authentication. Once a WiMAX capable terminal is switched on, an initial network process needs to be performed. FIG. 3 illustrates an example of the initial network entry process.

After the MS achieves DL (downlink) synchronization by receiving broadcast DL-MAP messages 300, it receives DCD and UCD messages to obtain DL and UL (Uplink) parameters 310, such as DL/UL burst profiles. Then the MS performs ranging 320 so that it can adjust physical parameters (frequency offset, UL transmit power, etc.). After negotiation of basic capability between the MS and BS 330, the authentication and key exchange process is undertaken 340. The MS is authenticated by an authentication server of an operator network and both the MS and BS share authentication keys and traffic encryption keys. Finally, registration is completed 350 and the MS is attached to the WiMAX network accordingly. Normally, some provisioned service flow (i.e. bearer) will be created by the BS for the coming data transfer.

In the current IEEE standards, there is no mechanism for the MS to notify the BS of the purpose of initial network entry in the situation where an MS user wants to make an emergency call. Therefore, the MS would need to take all the steps of initial network entry, which will take time, in order to attach to the WiMAX network as discussed above. Furthermore, the network does not permit an MS without a subscription to establish an emergency call because user and device authentications are basically mandatory.

In fact, IEEE802.16e provides an option to enable the MS to request "no authorization" during capability negotiation. The MS indicates "no authorization" in Authorization Policy Support TLV of an SBC-REQ message and sends the message to the serving BS. However, it was completely impossible for the serving BS to judge whether or not this authorization policy request was generated to establish an emergency call. A malicious MS may attempt to connect to the network utilizing this option.

Therefore, embodiments of the present invention address this drawback by adding a TLV (for example, one-bit length) in a RNG-REQ message to notify the BS that the MS intends to make an emergency call after the ongoing initial network entry. With this added TLV, the serving BS is able to interpret that the MS is now performing initial network entry for the purpose of emergency call establishment and can skip some processes of network entry to reduce the time for call setup. Omission of authentication is beneficial because the authentication consists of a number of message exchanges for EAP authentication and PKM key distribution. Also, this can permit an MS without a subscription to connect to the network for an emergency call because there is no authentication process.

Figure 10:
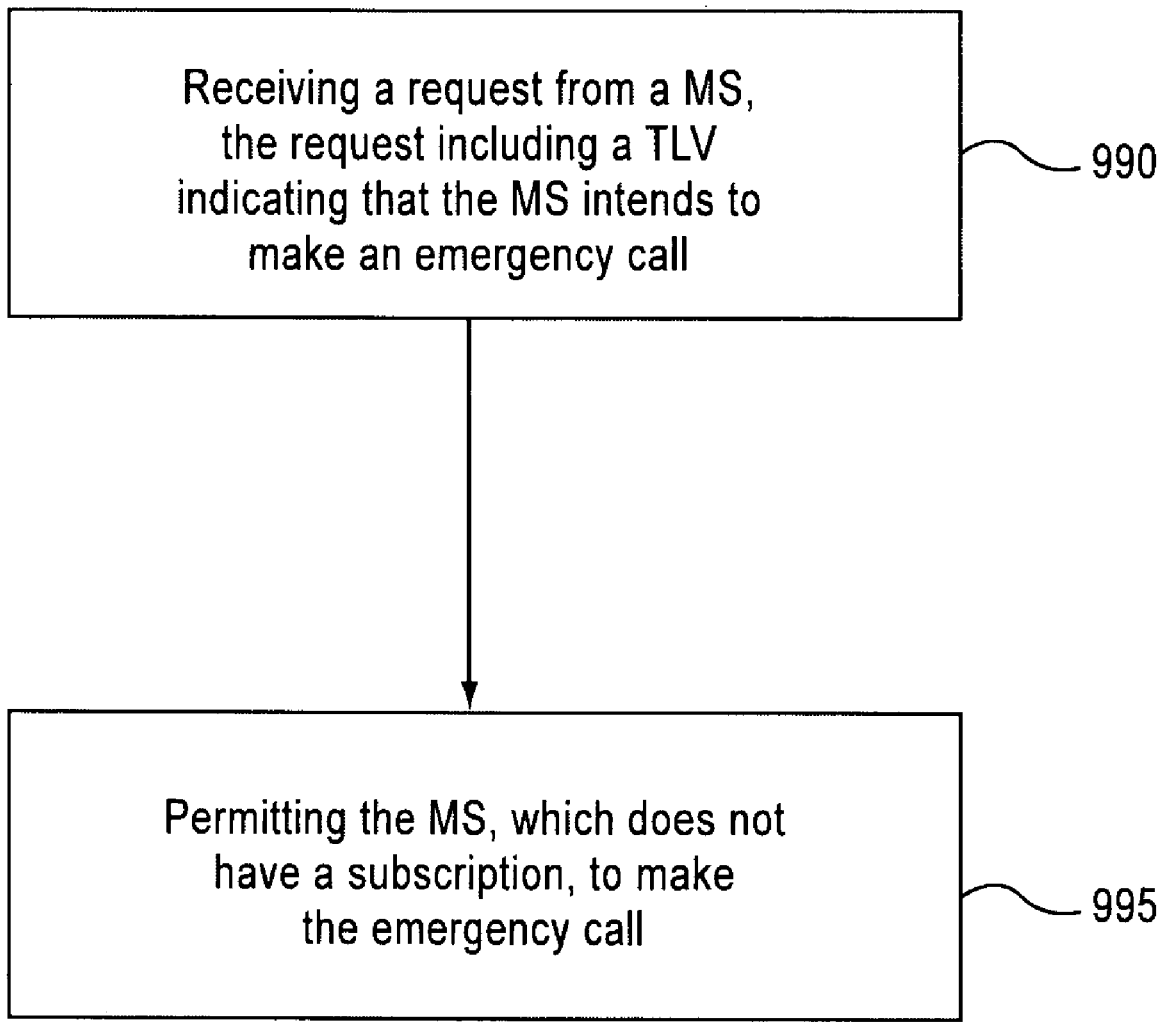
FIG. 10 is a flow diagram illustrating a method according to another embodiment of the invention.

FIG. 10 illustrates a method of providing emergency calling for a mobile station (MS) in a WiMAX network wherein the MS is not a subscriber to the network is provided. The method includes receiving a request at the base station (BS), the request including an added type length value (TLV) for notifying the BS that the MS intends to make an emergency call 990. The method further includes permitting the MS, which does not have a subscription, to connect to the network to make the emergency call without performing initial network entry authentication of the MS 995.

Embodiments of the present invention also provide for swift service flow activation. When an MS establishes an Emergency Call, it is important that the service flows that convey IMS signaling and the Emergency Call themselves are quickly set up and that their creation is not rejected by the BS when no resources are available.

Figure 4:
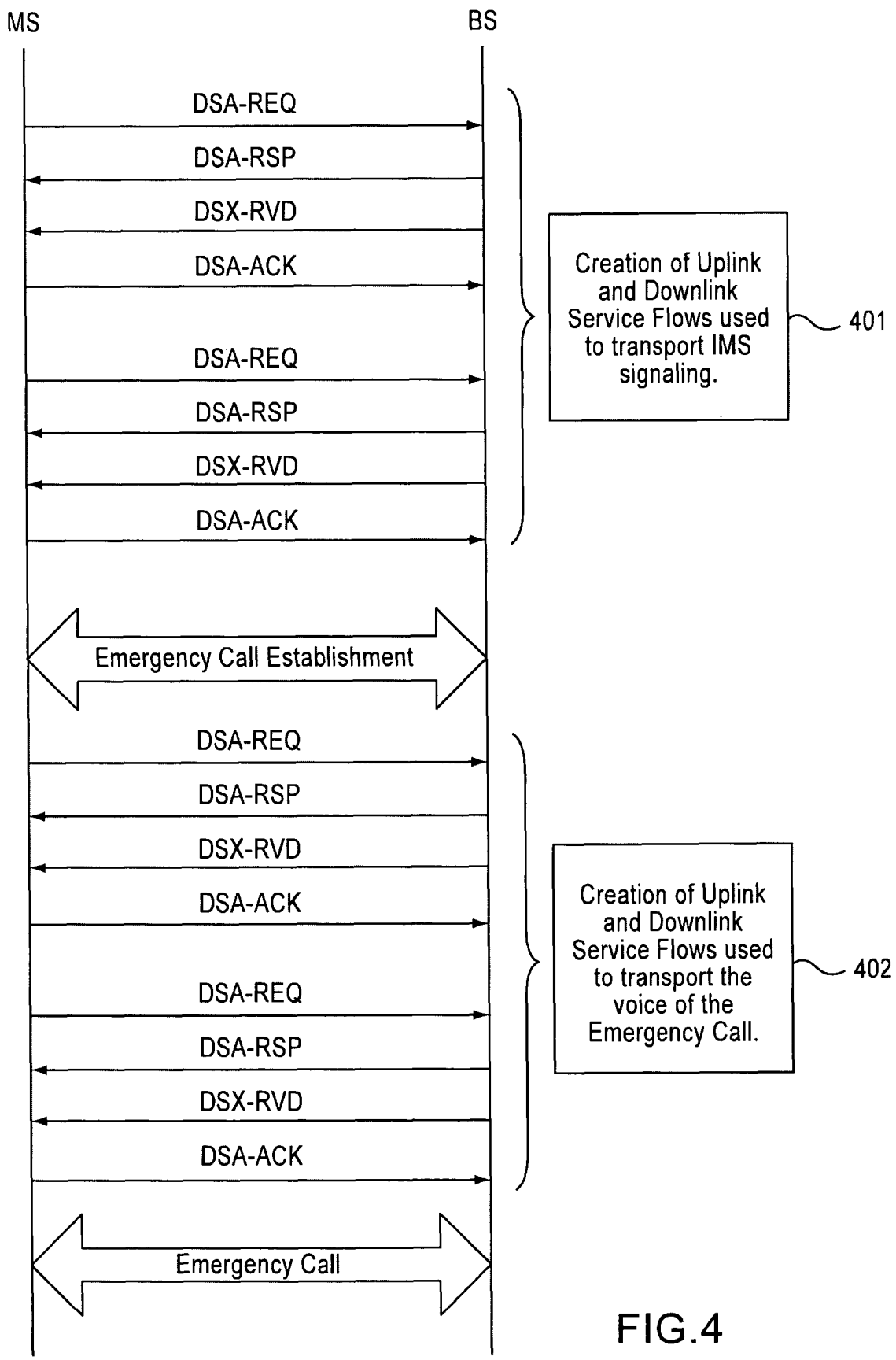
FIG. 4 illustrates a signaling diagram for emergency call establishment according to one example of the invention.

FIG. 4 illustrates the messages exchanged between the MS and BS during Emergency Call establishment, according to one embodiment of the invention. First, an uplink service flow and a downlink service flow used to transport VoIP signaling, e.g. IMS, are created 401. The emergency call is then established using these two service flows. Finally, an uplink service flow and a downlink service flow used to transport the voice of the emergency call are created 402 and the emergency call is performed using the service flows. The service flows can also be provisioned during network entry and activated at the time of the establishment of the emergency call. In that case, the messages exchanged in FIG. 4 are DSC messages instead of DSA messages.

In order to improve emergency call establishment, examples of the present invention provide for special handling of Emergency Service Flows. To ensure that service flows can always be created in case of emergency and that QoS for these service flows can be satisfied, the following features are provided: during service flow creation, the MS has a means of specifying that the service flow will be used for an emergency call; and the BS always keeps an amount of resources available for Emergency Service Flows. As a result, the BS is always ready to accept an Emergency Service Flow creation.

Figure 5:
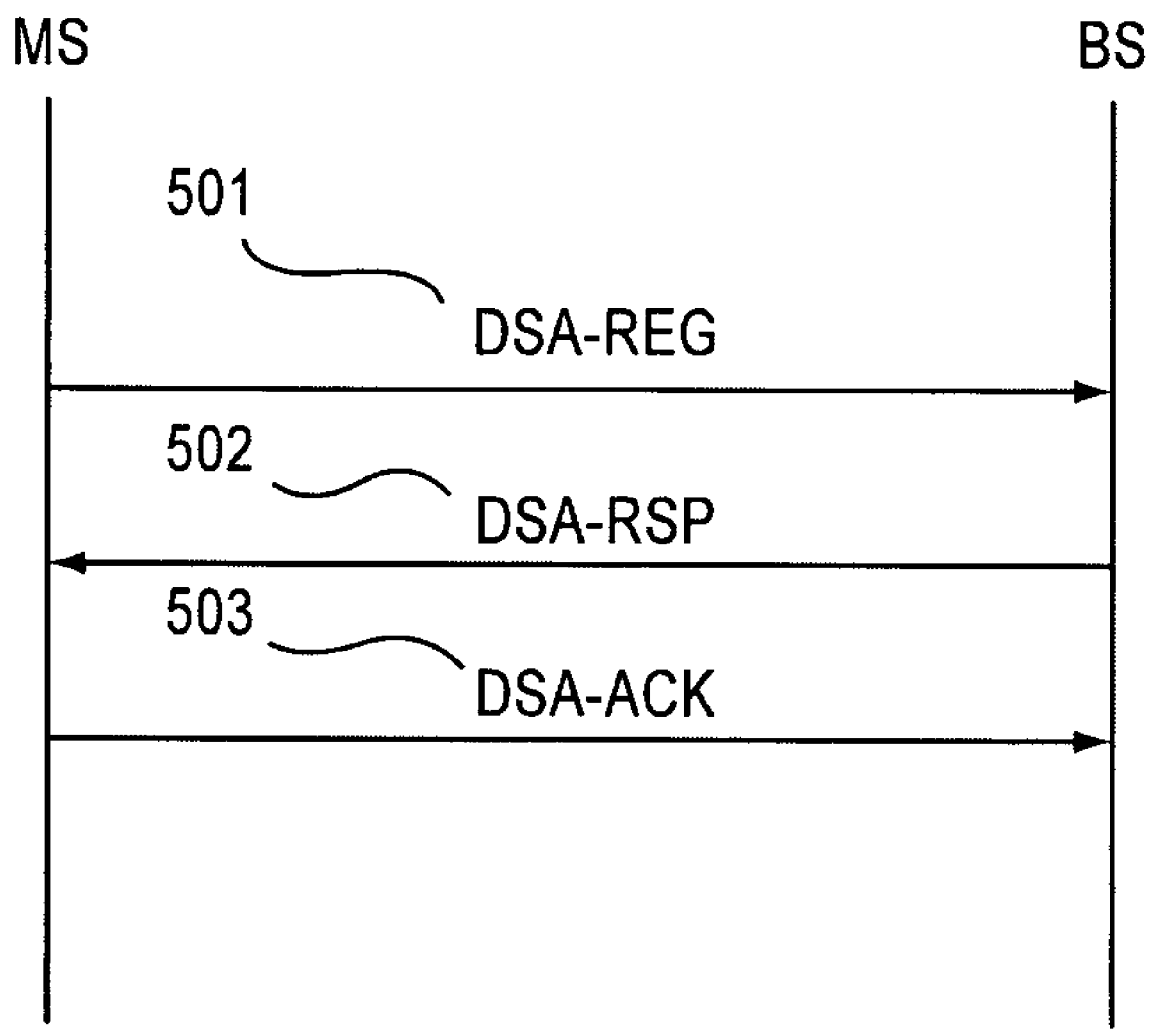
FIG. 5 illustrates a signaling diagram for emergency service flow creation according to an example of the invention.

FIG. 5 describes the messages exchanged between the MS and BS during Emergency Service Flow creation, according to an embodiment of the invention. The message sequence described in FIG. 5 can be performed both for creation of a Service Flow that will transport messages related to Emergency Call establishment and for creation of a Service flow that will transport the Emergency Call itself. As discussed above, the service flows can also be provisioned during network entry and activated at the time of the establishment of the emergency call. In that case, the messages exchanged in FIG. 5 are DSC messages instead of DSA messages.

As illustrated in FIG. 5, when creating a Service Flow, the MS sends a DSA-REQ message to the BS 501. A field in DSA-REQ can be used to notify the BS that this Service Flow is to be used for an Emergency Call. For example, the field "Global Service Class Name" defined in 11.13.24 of 802.16e, can be included with the value "EC" to indicate that this Service Flow is to be used for an Emergency Call. The "QoS parameters set type" included in DSA-REQ is set to 110 to indicate that the Service Flow being created has to be both admitted and activated.

Upon receipt of DSA-REQ including "Global Service Class Name" set to "EC", the BS allocates resources for this Service Flow from its amount of resources dedicated to Emergency Service Flows, and returns a DSA-RSP message 502. This operation is almost guaranteed to succeed because the BS always keeps an amount of resources for Emergency calls. In addition, the time for the BS to process DSA-REQ can be shortened because, as the BS knows it is an Emergency Service Flow, some steps of service flow creation can be omitted. For example, it may not be necessary to verify that the policy of user allows this service flow to be created. As a result, the BS does not need to send a DSX-RVD message but can instead directly send a DSA-RSP message upon receipt of the DSA-REQ. Finally, the MS returns DSA-ACK to confirm the Service Flow creation 503.

Embodiments of the present invention also provide for the use of existing Service Flows. Basic and Primary connections are always activated. These connections are used to transport MAC management messages and have a high priority. Also, the ISF (Initial Service Flow) is defined by WiMAX Forum and created just after network entry. This service flow transports messages related to IP address configuration. One of these service flows may be used to transport messages related to Emergency Call establishment. By doing so, the MAC management messages shown in FIG. 4 related to service flow creation do not need to be sent and thus the Emergency Call can be established more quickly.

The present invention further provides a method for expedited network re-entry from idle mode. When an MS is operated in idle mode and returns to normal data operation, the MS must carry out the network re-entry process. The MS performs ranging, capability negotiation, authorization and key exchange, and registration. According to the MS idle mode information retained in the network, the MS can omit transmission of some management messages. This process omission is instructed by the BS based on HO Process Optimization TLV in a RNG-RSP message.

Figure 6:
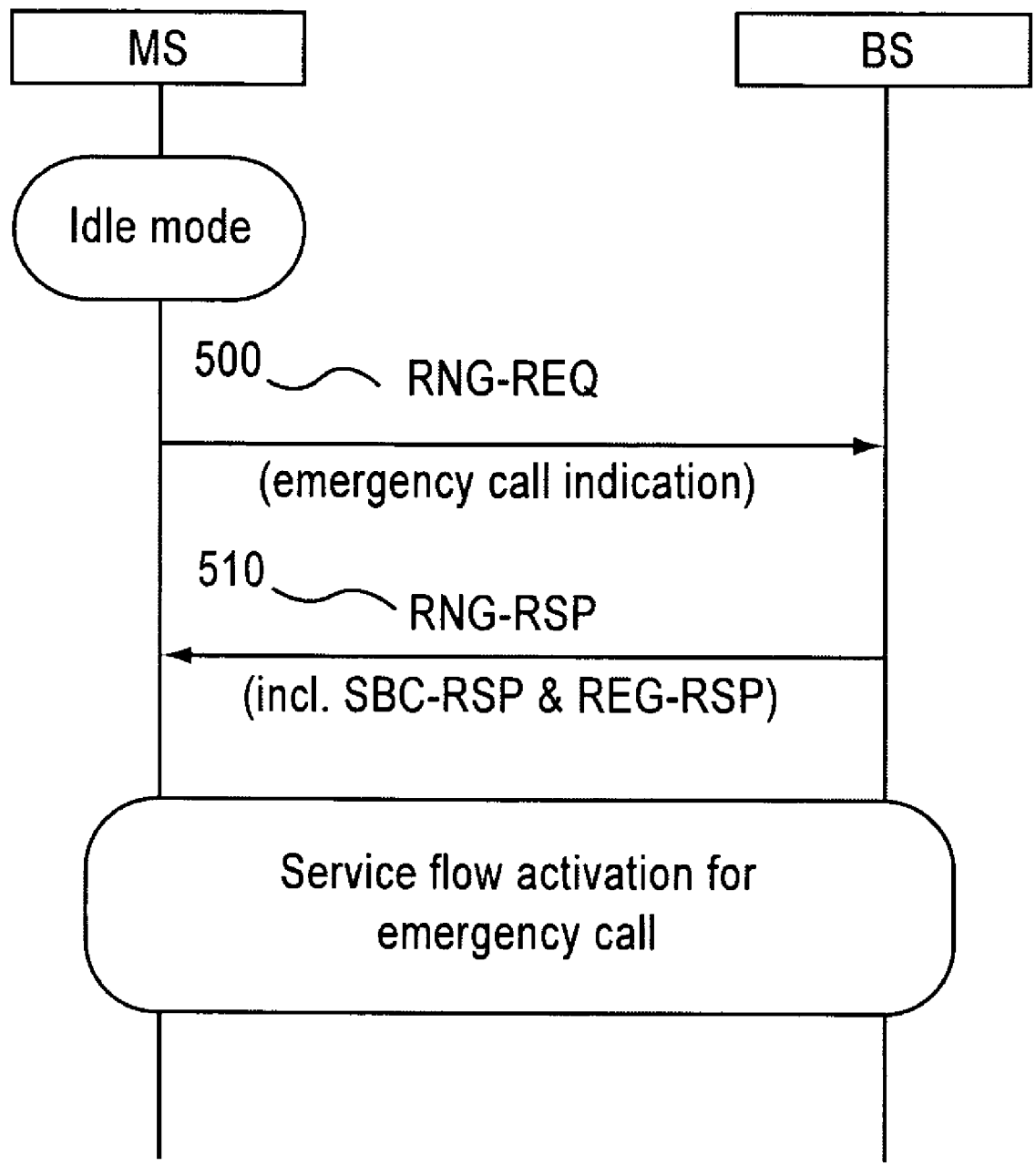
FIG. 6 illustrates a simplified network re-entry process according to an embodiment of the invention.

FIG. 6 illustrates a simplified network re-entry process flow which expedites emergency call establishment for an MS in idle mode. Currently, when an MS attempts an emergency call while it is in idle mode, it takes a long time until the call is finally set, particularly in a case where the network requests MS to privacy key management (PKM) authentication and key exchange. Therefore, embodiments of the present invention address this drawback by adding a TLV (for example, one-bit length) in a RNG-REQ message 500 to notify the BS that the MS wants to make an emergency call after return from idle mode.

When the MS indicates that the intention of network re-entry is emergency call setup with the proposed TLV in an UL RNG-REQ message, the BS should transmit only a RNG-RSP 510 message regardless of HO Process Optimization TLV and other management messages should be omitted. The RNG-RSP message may contain SBC-RSP and REG-RSP messages. Even if the BS does not have the MS operational information that are basically agreed upon in SBC-REQ/RSP and REG-REQ/RSP exchanges during initial network entry that the MS performed previously, the BS may be able to show operational parameters of SBC and REG to the MS that are mandatory to support by both the MS and the BS with RNG-RSP. Inclusion of this proposed TLV in RNG-REQ contributes to reducing time to return to idle mode for emergency call setup.

Transitioning to VoIP networks offers the opportunity to add significant enhancements to emergency call handling services, rather than simply duplicating the existing feature set. Some of the enhancements provided by the present invention include higher resilience, faster call setup, better information presentation, multimedia support, and lower costs. In order to achieve these objectives, the present invention provides an enhanced QoS scheme.

Figure 7:
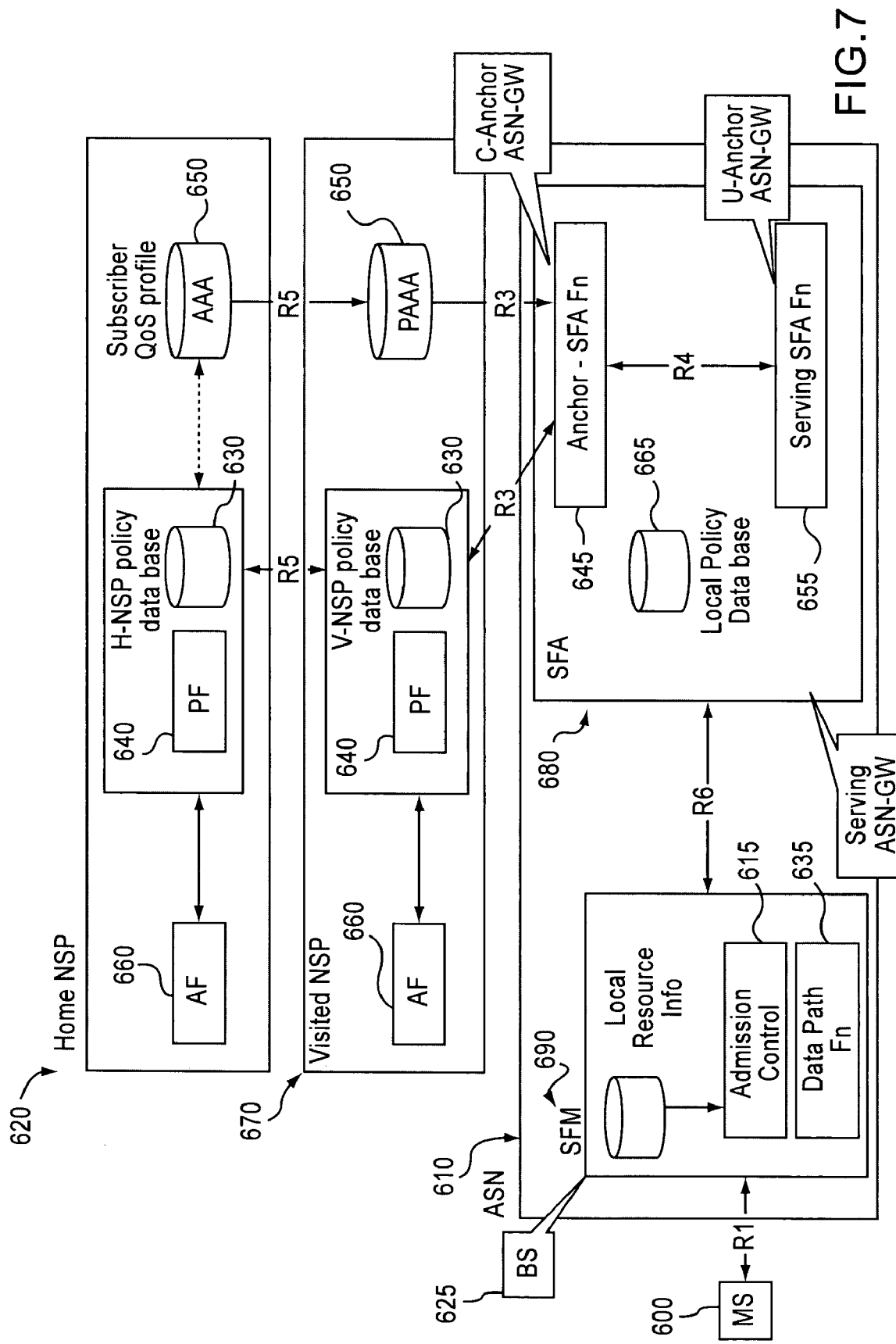
FIG. 7 illustrates a QoS architecture model according to an example of the invention.

FIG. 7 illustrates a QoS architecture model, according to one example of the invention. As illustrated, FIG. 7 includes the following elements:

MS 600 and ASN 610. The WiMAX network must support ASN-initiated creation, modification and deletion of service flows. An MS 600 may, but is not required to, have this capability (the MS must, however, respond appropriately to ASN-initiated service flow actions).

The home policy function (PF) 640 and its associated policy database 630 belong to the home NSP 620 (H-NSP). Maintained information includes H-NSP's general policy rules as well as application dependant policy rules. The AAA 650 may, in addition, provision the policy database 630 with user's QoS profile and associated policies. The PF 640 is in charge of evaluating service requests against these policies. The MS 600 directly communicates with the AF 660 using application layer control protocols, and the AF 660 may issue WiMAX service flow triggers to the PF 640 as a result (in roaming case, the AF 660 could be located at the H-NSP as well as at the visited NSP 670 (V-NSP) where the corresponding PF's are triggered).

AAA server 650 holds the user's QoS profile and associated policy rules. This information can be used in two different ways. They can be downloaded to the SFA 680 at network entry as part of the authentication and authorization procedure. Alternatively, they can be provisioned in the PF 640. In the former case, the SFA 680 evaluates the forthcoming service request against the user profile. In the latter case, it is up to the home PF 640 to do so.

A Service Flow Management (SFM) 690 logical entity in the ASN 610. The SFM 690 entity is responsible for the creation, admission, activation, modification and deletion of 802.16 service flows. It includes an Admission Control (AC) 615 function, and associated local resource information. The AC is used to decide whether a new service flow can be admitted based on existing radio and other local resource usage. The SFM 690 entity may be located in the BS 625.

Service Flow Authorization (SFA) 680 logical entities in the ASN 610. In case the user QoS profile is downloaded from the AAA 650 into the SFA 680 at the network entry phase, the SFA 680 is responsible for evaluating any service request against user QoS profile. For a given ASN/NAP there exists an anchor SFA 645 assigned to each MS 600. The anchor SFA 645 does not change for the duration of the MS authentication session. Optionally, there may be one or more additional SFA entities that relay QoS related primitives and apply QoS policy for that MS. The relay SFA that directly communicates with the SFM is called the serving SFA 655 (when there are no relays, the anchor SFA is also the serving SFA). The identity of the serving SFA 655, if different from the anchor, is known by the anchor SFA 645 at all times. Similarly, the serving SFA 655 knows the identity of the anchor SFA 645. The anchor 645 and/or serving SFA 655 may also perform ASN-level policy enforcement using a local policy database 665 and an associated local policy function (LPF). The LPF can also be used to enforce admission control based on available resources. A serving SFA 655 may be in the bearer path towards the MS 600.

A network management system (not shown) that allows administratively provisioning service flows.

Thus, embodiments of the present invention provide an efficient QoS scheme to support emergency services. The invention takes advantage of the available elements to provide the highest priority to emergency services. Priority indications are given in different ways according to the specific message information. The QoS scheme of the present invention includes the following features: emergency and/or priority service indications are provided in QoS of MAC layer which covers the interface between the MS and BS (a.k.a. R1 interface); emergency and/or priority service indications are provided in the communication message among the BS, ASN-GWs, i.e. R6 and R4 interface, and, if available, geographical location information can be included in the TLV part when the MS tries to set up or modify the services.

The core of the QoS scheme in WiMAX is the concept of service flow. A service flow is a unidirectional flow of packets that is provided with a particular QoS. The BS and MS provide this QoS according to the QoS parameters defined for the service flow. According to the latest specification of IEEE 802.16e, any service flow may have its QoS Parameter Set specified in any of the following three ways or combinations: (1) by indirectly referring to a set of traffic parameters by specifying a Service Class Name; (2) by explicitly including all traffic parameters; (3) by specifying a Service Class Name along with modifying parameters.

In order to provide the emergency service with the highest priority, the BS (if the emergency service is initiated by MS) or the MS (if the emergency service is initiated by BS) should distinguish the service type (i.e. emergency service) as soon as possible. There are several different ways to indicate the emergency services as outlined below.

First, a "Traffic Priority" parameter may be used in the QoS parameter set. The QoS parameter set can also be clearly defined when the MS or the BS is trying to set up emergency service. The "traffic priority" parameter (see 11.13.5 in IEEE 802.16-2005) may be used to indicate the emergency service. For uplink service flows, the BS shall use this parameter when determining precedence in request service and grant generation.

TABLE 1

| Type | Length | Value | Scope |
|---|---|---|---|
| [145/146].6 | 1 | 0 to 7 - Higher numbers indicate higher priority Default 0 | DSx-REQ DSx-RSP DSx-ACK REG-RSP |

As shown in Table 1, the length of the field is 1 byte with the default value 0. It is normal to set the highest number in traffic priority to indicate the highest priority for the emergency service, i.e. setting the traffic priority as 0xFF. When the MS tries to set up the emergency services with clearly defined QoS parameters right after the BS decodes the messages carrying "Traffic Priority", the BS will know the call is for emergency service and provide the highest priority.

As discussed above, the reserved field in global service class name may also be used. Global service class name is a rule-based, composite name parsed in eight information fields of format ISBRLSPTR where R represents the reserved field of 4-bit length. Although there is one field "maximum latency" which can also provide the priority requirement information, it is not sufficient. Therefore, embodiments of the present invention use the 4-bit inside reserved field to indicate the service priority. Consequently, there will be 16 levels of different priorities. As such, any combination of this 4-bit field may be used to indicate emergency services, an example may be 0b1111.

When the MS tries to set up the emergency services with global service class name after the BS decodes the message, the BS will know the call is for emergency service and provide the highest priority. In the scenarios where service class name instead of global service class name is used, traffic priority is included as one element associated with the service class name.

Preferably, at least one method to show the emergency priority should be employed when the emergency service is set up. However, more than one method or a combination of different methods may be used. Therefore, it is possible that different methods are employed at the same time.

In addition to the indication of emergency services, geographical location information may be included in the messages for service set up or change since the specific location information plays a key role in the emergency service. Also, an additional round of message exchange may be avoided by including the geographical location information. In the scenarios where the MS can determine its own geographical location, this information can be included in the message for service setting up/modification in order to reduce latency. One way to implement this is to place the location information in the TLV fields in DSx-REQ messages. The geographical location information includes, but is not limited to: Latitude (optional accuracy level), Longitude (optional accuracy level), Altitude and/or floors (optional accuracy level), and Optional velocity (optional accuracy level). The BS can then retrieve the geographical location information of the MS immediately. The MS may also report the location information in another message or the BS may request the MS's location information.

In the cases where the MS cannot retrieve its location information, the BS may retrieve this information from other network elements, such as ASN-GW, and insert this information into related messages. In this manner, the location information can be transmitted to the emergency center.

Among the parameters included in various messages, all of the following items can be used to indicate the emergency service:

Media Flow Description: this is the field in the data packet utilized for classification. One field in the message can be used to indicate the emergency services.

Media Flow Type: this IE defines the description of the application types, used as a hint in admission decision.

QoS Priority: The priority of a RR-Request or PD-Request. This parameter may be used to indicate different priority resource requests. Additionally, it is easy for the receiving network elements to know that the request is for emergency service.

Resource Description QoS parameters for the RR and PD messages. This field includes the descriptions of QoS parameters. The parameters may be explicitly expressed or may be expressed as service class name or may be coded in the form of 802.16e Global Service Class Name. So it may include the emergency service indication coming from 802.16e MAC.

Figure 8:
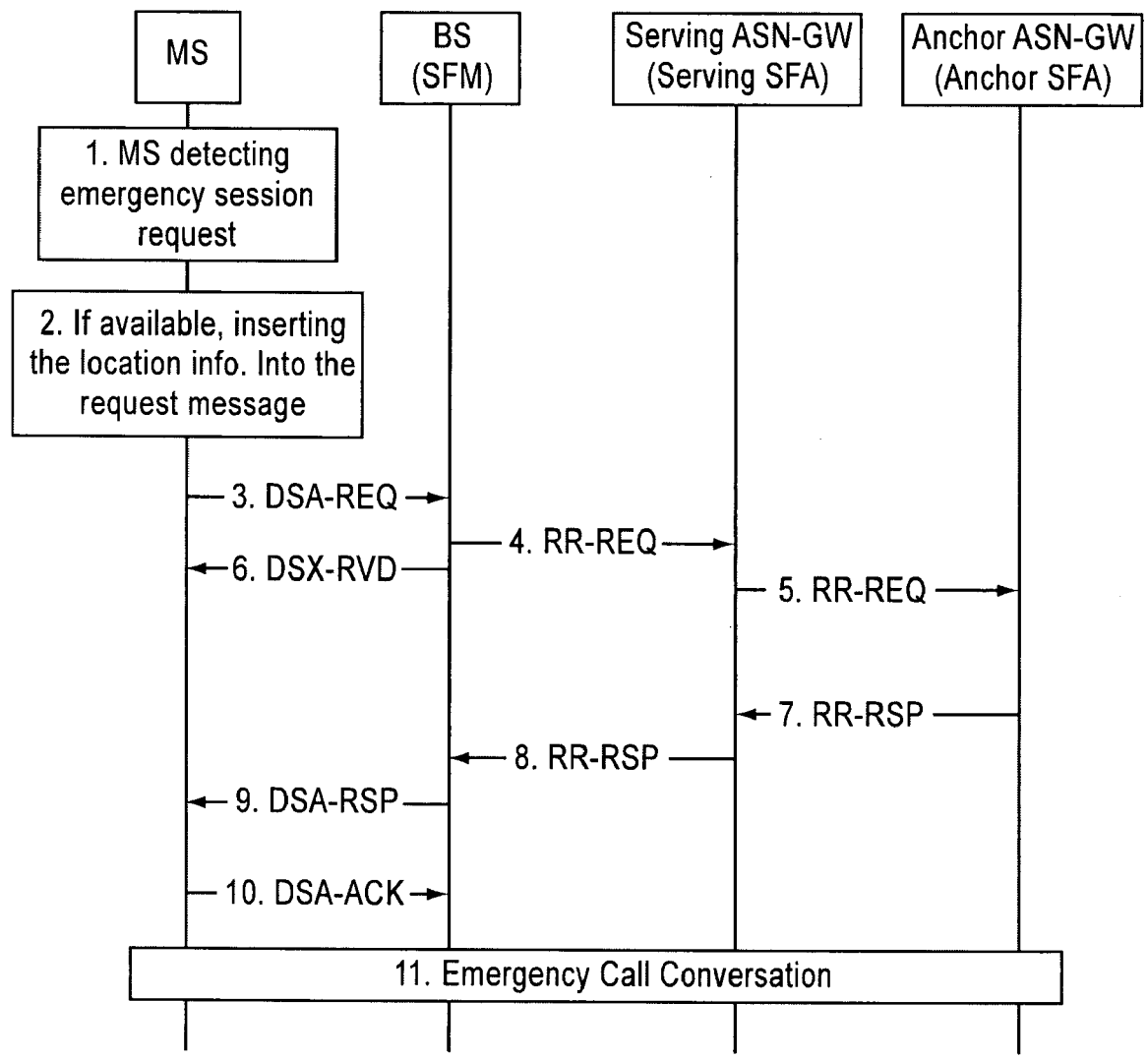
FIG. 8 illustrates an example of emergency service set up.

FIG. 8 illustrates an example of an emergency service set up signaling diagram according to one embodiment of the invention. The emergency call indication may appear in all of the messages except 3 DSX-RVD. First, the user dials the emergency number. The geographical location information is inserted in the message 2 of DSA-REQ 3 (dynamic service addition). After the BS receives this message, the BS will check whether there is location information in the DSA-REQ. If not, the BS will include the location information request IE in RR-REQ 4 (resource request) sent to serving ASN-GW. The BS will send response message DSX-RVD 6 to indicate the receiving of the DSA-REQ. After the processing at serving ASN-GW 5 and anchor ASN-GW 7, a response message will be sent back to the BS 8. Then, the BS will send back the DSA-RSP 9 to the MS. After getting all the requested resources, a DSA-ACK 10 is sent to the BS and the MS can begin the call conversation.

In the scenarios where the MS cannot identify the emergency service, the BS can identify the emergency service and inform other network elements including ASN-GW and MS.

Figure 9:
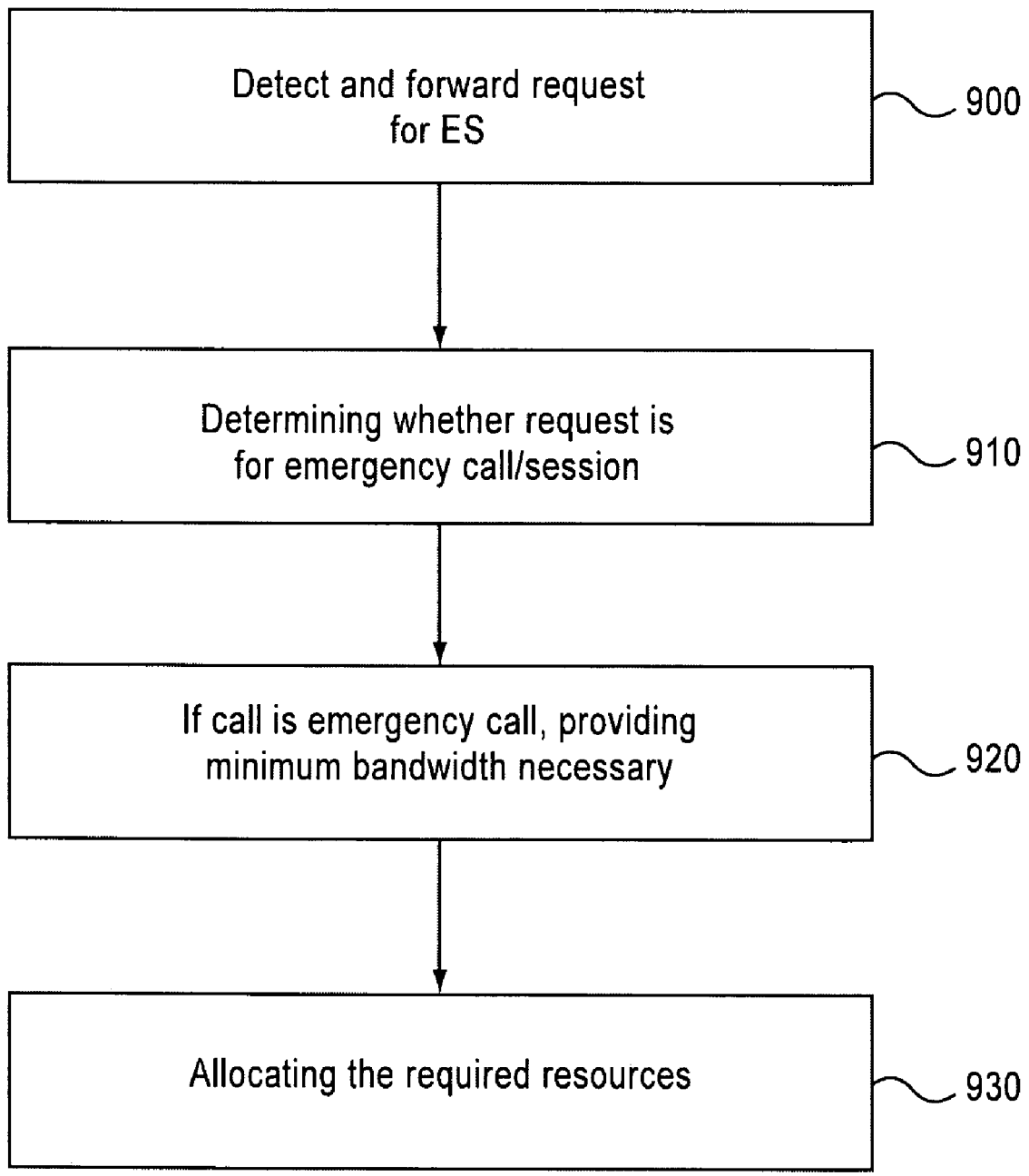
FIG. 9 is a flow diagram illustrating a method according to one embodiment of the invention.

FIG. 9 illustrates a method according to one embodiment of the invention. In one example, the MS detects and sends a request for an emergency services (ES) session 900. The BS determines that the request is for an ES session 910 and allocates radio resources to the MS. An ES session is established in the ASN providing the minimum bandwidth necessary to enable SIP signaling 920 and allocating the required resources from the ASN-GW to the MS 930. In addition, the MS may be allocated an IP address whose scope is in the CSN. The MS may then perform an IMS Emergency Registration. The proxy call session control function (P-CSCF) recognizes the SIP INVITE with special "emergency indication" and routes the ES traffic to the emergency call session control function (E-CSCF) in the same network. The E-CSCF routes the ES call to a PSAP directly along with ES session related information. The MS sends its own geographic location information, a WiMAX cell-id or a BSID, in the SIP INVITE. The MS may also send more accurate location information if it is equipped with a global positioning system receiver or if the MS has been provided with its own address. The E-CSCF determines the corresponding PSAP routing information based on the location information of the MS and routes the emergency call along with the location information to the PSAP.

The location information of the MS is needed in order to enable the IMS network to correctly route the ES session to the proper PSAP and to enable the PSAP to obtain accurate and/or updated information regarding the location of the MS during and after the ES session. Accordingly, embodiments of the invention support Emergency Location Information Delivery (ELID) which delivers the position (for example, latitude and longitude) of an ES caller to the emergency services provider. In addition to the position of the caller, the identification of the caller's base station, cell site or sector is also provided. According to one example of the invention, the MS inserts the BSID of the WiMAX access node in the SIP INVITE. The IMS is able to determine which PSAP serves the area of the relevant WiMAX access node and to route the emergency call to that PSAP.

In order to provide emergency services in VoIP network, it is necessary to have a standardized method for identifying the emergency session. Embodiments of the present invention provide such a method by defining the syntax for the Network Access Identifier (NAI). The NAI is a user identity submitted by the client during network access authentication. In roaming, the purpose of the NAI is to identify the user as well as to assist in the routing of the authentication request. During an emergency session, however, user authentication is not needed. In order to provide call priority, security and better quality of service, the present invention allows the access network to be able to detect the emergency indication. It also helps the network to route the emergency session to the nearest PSAP for assistance.

Additional embodiments of the invention provide a standardized method for identifying the emergency session. If the MS is already connected or attached to the network, it can use VoIP infrastructure to make emergency call. The Network identifies the emergency session and does the call priority. In this case there is no extra requirement to the network or MSS.

However, when the MS is not connected to the network, but due to emergency wants to access the network and use emergency service, two situations arise. The first situation is the network entry case where the user is an anonymous user without any credentials. The second situation is the network re-entry case where a roaming user is connected to Home CSN (as Home Agent) and Home VoIP Server. When the user needs to make an emergency call, the MS may initiate de-registration from the Home network and perform re-registration to the visited network to make the emergency call, or the MS may initiate an Emergency Session request to the Home VoIP Server, which in turn identifies the geographical location of the MS as roaming and rejects the request with error cause "Use Visited Network".

Due to rejection from the home network, the MS may initiate de-registration from the Home network and perform re-registration with the visited network for the emergency session. During re-registration the MS must indicate cause "Emergency Call", otherwise it may end up in Home HA. In case of emergency, an emergency call is established between the nearest PSAP (visited network) and the MS.

The NAI can be constructed so that it indicates emergency session to get special treatment such as access to the network for roaming and anonymous users, call priority, security, better quality of service and route optimization (emergency session for roaming user handled at visited network).

The following is an example of Emergency NAI Definitions according to an embodiment of the invention:

| | | | |
|---|---|---|---|
| nai | = E911"." | | ; E911 for any user in home network |
| nai | =/ E911A "." | | ; E911 for anonymous user using MAC Address |
| nai | =/ E911U "." | | ; E911 for anonymous user using any name |
| nai | =/ E911R "." | | ; E911 for any user in roaming network |
| nai | = username | | ; Format is as per RFC 4282 |
| nai | =/ "@" realm | | ; Format is as per RFC 4282 |
| nai | =/ username "@" realm | | ; Format is as per RFC 4282 |

With emergency extension, a user's credentials can be skipped. E911U for an anonymous user may not be sufficient in some networks due to denial of service attack. In that case, the network may request the MAC address (device authentication).

The Emergency NAI (Root NAI) may take the form of a NAI, for example, username@realm. With emergency prefix the result shall be an NAI in the form of: E911.UserName@NSP1.com.

The Decorated NAI may take the form of a NAI, for example, homerealm!username@otherrealm.

A roaming NAI is usually constructed when the MSS authenticates through a visited network. In the case of emergency indication, it need not authenticate to the visited network. The MSS may indicate in the NAI both the user's home network and the chosen visited network. With emergency prefix the result shall be an NAI in the form of: NSP4!E911R.UserName@NSP1.com.

One reason for defining E911R is that the visited network can optionally override the NSP (Home network) during emergency session. Hence, there is no need to route the emergency call to the home network. Instead, it can be served at PSAP in visited network.

The Emergency NAI for an anonymous user (Alternative NAI) may take the form of a NAI, for example, any_username@REALM. The alternative NAI may not be routable from any AAA server. With emergency prefix the result shall be an NAI in the form of: E911U.any_username@NSP1.com, NSP4!E911A.MAC.MACAddress@NSP1.com, or E911A.MAC.MACAddress@NSP4.com.

Mobile IPv4 Extension for Carrying Network Access Identifiers [RFC 3846] defines the format NAI Carrying Extension which can also be used for emergency session during Mobile IP Registration Request and Reply Message. The extension may be used by any node that parses extended NAI:

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|     Type      |    Length     |   Sub-Type    |    NAI ...    |
+-+-+-+-+-+-+-+-+-+-+-+-+-+-+-+-+-+-+-+-+-+-+-+-+-+-+-+-+-+-+-+-+
    Type: 136.
```

Length: 8-bit unsigned integer. Length of the extension, in octets, excluding the extension Type and the extension Length fields. This field is set to 1 plus the total length of the NAI field.

Sub-Type: This field describes the particular type NAI which is carried in the NAI field.

NAI: Contains the NAI in a string format.

Emergency Sub-Type 3 can be used for E911 extension for any user in home network, for example, E911. UserName@NSP1.com. Emergency Sub-type 4 can be used for E911A for anonymous user using MAC Address, for example, E911A.MAC.MACAddress@NSP4.com. Emergency Sub-type 5 can be used for E911U for anonymous user using any name, for example, E911U.any_username@NSP1.com. Emergency Sub-type 6 can be used for E911R for any user in a roaming network, for example, NSP4!E911R.UserName@NSP1.com.

As a result of the above-described examples of the invention, the authentication process can be bypassed due to early indication of an emergency session. Additionally, Route optimization (for roaming user) is achieved by serving the emergency session at visited network rather than forwarding it to home network. Call priority, security and better quality of service are also guaranteed at first level of parsing. The present invention also results in protection against a denial of service attack and allows for an anonymous user to establish emergency session without the normally required credentials.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

We claim:

1. A method comprising:
   receiving a request from a subscriber station in a wireless communication network;
   detecting whether the request is for an emergency call;
   when it is determined that the request is for an emergency call,
   transmitting the request to an access service network; and
   allocating required resources for making the emergency call;
   wherein the request comprises an indication whether an emergency call is being requested and the indication is included in at least one of a media access control message and a network access identifier.

2. The method of claim 1, further comprising at least one of:
   randomly dropping non-emergency calls when more resources are required for the emergency call;
   providing a geographic location of the subscriber station; and
   providing a minimum bandwidth required to enable session initiation protocol signaling.

3. The method of claim 1, wherein the detecting comprises detecting that the call is an emergency call based on information contained in at least one of a network access identifier, a global service class name field, and a traffic priority parameter.

4. The method of claim 1, wherein authentication is not performed when the request indicates that the subscriber station intends to make an emergency call.

5. An apparatus comprising:
   a transmitter configured to transmit a request for an emergency call in a wireless communication network to a base station, the request comprising an indication whether an emergency call is being requested; and
   a receiver configured to receive a response including allocated resources for making the emergency call from an access service network;
   wherein the indication is included in at least one of a media access control message and a network access identifier.

6. The apparatus of claim 5, wherein non-emergency calls are randomly dropped when more resources are required for the emergency call.

7. The apparatus of claim 5, wherein the request further comprises a traffic priority parameter to indicate that the request is for an emergency call.

8. The apparatus of claim 5, wherein prioritized signal processing and bandwidth are reserved to provide session initiation protocol signaling.

9. The apparatus of claim 5, wherein the apparatus is further configured to perform code signaling with power set to a maximum transmission power.

10. The apparatus of claim 5, wherein the apparatus is further configured to perform a handover to another network when the wireless communication network does not support the emergency mode or when attempts to enter the emergency mode fail.

11. The apparatus of claim 10, wherein in order to perform the handover, the apparatus is configured to add emergency support information into a media access control message to the base station.

12. An apparatus comprising:
    a receiver configured to receive a request from a subscriber station attempting to make an emergency call in a wireless communication network;
    an allocator configured to allocate resources for the emergency call; and
    a transmitter configured to transmit a response, to the subscriber station, including an indication of the allocated resources;
    wherein the request comprises an indication whether an emergency call is being requested and the indication is included in at least one of a media access control message and a network access identifier.

13. The apparatus of claim 12, wherein non-emergency calls are randomly dropped when more resources are required for the emergency call.

14. The apparatus of claim 12, wherein at least one of a network access identifier, a global service class name field, and a traffic priority parameter is included in the request to indicate that the service being requested is an emergency call.

15. The apparatus of claim 12, wherein the apparatus is configured to provide a highest level of priority for the emergency call.

16. The apparatus of claim 12, wherein the apparatus is configured to perform a handover of the subscriber station to another network when the wireless communication network does not support the emergency mode or when attempts to enter the emergency mode fail.

17. A method comprising:
   transmitting a request for an emergency call in a wireless communication network from a subscriber station to a base station, the request comprising an indication whether the an emergency call is being requested; and
   receiving a response including allocated resources for making the emergency call from an access service network;
   wherein the indication is included in at least one of a media access control message and a network access identifier.

18. The method of claim 17, wherein non-emergency calls are randomly dropped when more resources are required for the emergency call.

19. The method of claim 17, further comprising at least one of providing a geographic location of the subscriber station; and
   entering into an emergency mode prior to transmitting the request and requesting entry into the emergency mode by utilizing at least one of ranging and network access identifier.

20. The method of claim 17, wherein the request comprises a traffic priority parameter to indicate that the request is for an emergency call.

21. The method of claim 17, further comprising performing a handover to another network when the wireless communication network does not support the emergency mode or when attempts to enter the emergency mode fail.

22. A computer program, embodied on a computer readable medium, the computer program configured to control a processor to perform a method comprising:
   receiving a request from a subscriber station in a wireless communication network;
   detecting whether the request is for an emergency call;
   when it is determined that the request is for an emergency call,
   transmitting the request to an access service network; and
   allocating required resources for making the emergency call;
   wherein the request comprises an indication whether an emergency call is being requested and the indication is included in at least one of a media access control message and a network access identifier.

23. A computer program, embodied on a computer readable medium, the computer program configured to control a processor to perform a method comprising:
   transmitting a request for an emergency call in a wireless communication network from a subscriber station to a base station, the request comprising an indication whether an emergency call is being requested; and
   receiving a response including allocated resources for making the emergency call from an access service network;
   wherein the indication is included in at least one of a media access control message and a network access identifier.

* * * * *